US012650160B2

(12) United States Patent
Amemiya et al.

(10) Patent No.: US 12,650,160 B2
(45) Date of Patent: Jun. 9, 2026

(54) BALL SCREW DEVICE

(71) Applicant: THK CO., LTD., Tokyo (JP)

(72) Inventors: Yohei Amemiya, Tokyo (JP); Yuki Hayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/864,082

(22) PCT Filed: May 17, 2023

(86) PCT No.: PCT/JP2023/018437
§ 371 (c)(1),
(2) Date: Nov. 8, 2024

(87) PCT Pub. No.: WO2023/234029
PCT Pub. Date: Dec. 7, 2023

(65) Prior Publication Data
US 2025/0305567 A1    Oct. 2, 2025

(30) Foreign Application Priority Data

Jun. 1, 2022    (JP) ................................. 2022-089825

(51) Int. Cl.
*F16H 25/22*        (2006.01)
(52) U.S. Cl.
CPC ................................ *F16H 25/2223* (2013.01)
(58) Field of Classification Search
CPC ............. F16H 25/2223; F16H 25/2214; F16H 25/2204; F16H 25/22; F16H 25/24
See application file for complete search history.

(56) References Cited

U.S. PATENT DOCUMENTS

2016/0207560 A1* 7/2016 Muto .................... B62D 5/0448

FOREIGN PATENT DOCUMENTS

| JP | 2009-250345 A | 10/2009 |
| JP | 2015-24471 A | 2/2015 |
| JP | 2017-9097 A | 1/2017 |

OTHER PUBLICATIONS

International Search Report dated Jun. 20, 2023, issued in counterpart International Application No. PCT/JP2023/018437, with English Translation. (5 pages).

* cited by examiner

*Primary Examiner* — Terence Boes
(74) *Attorney, Agent, or Firm* — WHDA, LLP

(57)            ABSTRACT

Provided is a ball screw device including: a large number of balls; a screw shaft (110) having a rolling groove (111) for the balls, which is formed in a spiral shape in an outer peripheral surface of the screw shaft (110); and a nut member (120) having: a through hole that allows the screw shaft (110) to be inserted through the through hole; and a forwarding groove (210), which is formed in an inner peripheral surface (240) of the through hole, and allows the large number of balls to circulate around a periphery of the screw shaft (110) only one round, the nut member (120) being configured to be threadedly engaged with the screw shaft (110) through intermediation of the large number of balls. The forwarding groove (210) includes: a load rolling groove (121) that faces a part of the rolling groove (111) of the screw shaft (110); and a circulation groove (220), which is formed so as to traverse a screw thread of the screw shaft (110) to connect both ends of the load rolling groove (121) to each other. The forwarding groove (210) is formed so as to be adjacent to an opening edge of the through hole of the nut member (120). An inclination portion (230) is provided at an angular portion (310) at which the inner peripheral surface (240) of the through hole and an axial end surface of the nut member (120) intersect with each other, the inclination portion (230) being formed by cutting out the angular portion (310) so that the inclination portion (230) has a (Continued)

non-uniform width along a circumferential direction of the
through hole.

4 Claims, 9 Drawing Sheets

Fig. 6

BALL SCREW DEVICE

TECHNICAL FIELD

The present invention relates to a ball screw device in which a ball endless circulation path that corresponds to one round around a periphery of a screw shaft is formed in a nut member.

BACKGROUND ART

A ball screw device is a mechanical element capable of performing conversion between a rotary motion and a linear motion, and has been widely used in various machine tools, conveying devices, industrial robots, and the like, for the purpose of converting a rotary motion generated by a servomotor into a linear motion. Such a ball screw device includes: a screw shaft having a spiral rolling groove formed therein; a large number of balls that roll in the rolling groove; and a nut member having a through hole that allows the screw shaft to be inserted through the through hole, and an endless circulation path that allows the large number of balls to roll in the endless circulation path. The screw shaft and the nut member are threadedly engaged with each other through intermediation of the large number of balls. As related-art ball screw devices, various types of ball screw devices that are different in the structure of the endless circulation path are publicly known. In Patent Literature 1, there is disclosed a ball screw device in which a plurality of circuits of endless circulation paths, each of which has one circuit corresponding to one round around a periphery of a screw shaft, are formed in such a nut member as described above.

In the ball screw device of Patent Literature 1, a load rolling groove that faces a part of a rolling groove of the screw shaft is formed in an inner peripheral surface of a through hole of the nut member, and a circulation groove that connects a start end and a terminal end of the load rolling groove to each other is provided. The load rolling groove faces the rolling groove of the screw shaft to thereby form a load path, and balls roll within the load path while bearing a load between the screw shaft and the nut member. Meanwhile, the circulation groove is a no-load path that allows the balls to roll in the circulation groove under a state in which the balls are released from the load, and connects both ends of the load path to each other to form an endless circulation path for the balls. The circulation groove allows each of the balls, which has reached the terminal end of the load path, to be separated from the rolling groove of the screw shaft so as to pass over a screw thread, and to then return to the start end of the load path. That is, the circulation groove enables each of the balls rolling within the load path, to return to a previous position by one lead of the rolling groove of the screw shaft. Accordingly, each of the endless circulation paths formed in the nut member is configured to have one circuit corresponding to one round around the periphery of the screw shaft.

In the ball screw device of Patent Literature 1 as described above, the load rolling groove and the circulation groove are formed directly in the inner peripheral surface of the nut member. Particularly, the latter circulation groove is formed by performing cutting work on the inner peripheral surface of the nut member with use of a tool such as an end mill. In such cutting work, the tool is inserted into the through hole of the nut member from an axial direction of the through hole, cutting is then performed with use of the tool on the inner peripheral surface of the through hole in a radial direction, and a depth of the cutting is controlled, to thereby form the circulation groove.

CITATION LIST

Patent Literature

[PTL 1] JP 2015-24471 A

DISCLOSURE OF THE INVENTION

Problems to be Solved by the Invention

As described above, the circulation groove allows each of the balls to be separated from the rolling groove of the screw shaft to pass over the screw thread of the screw shaft. Thus, the circulation groove is formed not as a path that is separated from the screw shaft, but as a path that is opened to the screw shaft.

Accordingly, the balls rolling in the circulation groove are liable to be irregularly brought into contact with the screw thread of the screw shaft, and hence, there has been a fear in that smooth circulation of the balls within the endless circulation path may be hindered.

When consideration is given to preventing contact between the balls rolling within the circulation groove and the screw shaft as much as possible, and smooth traveling of the balls from the rolling groove of the screw shaft to the circulation groove, it is conceivable that a holding portion is provided at an opening edge of the circulation groove along a traveling direction of the balls, and an opening width of the circulation groove that is opened toward the screw shaft is made smaller than a diameter of each of the balls.

In this regard, in Patent Literature 1, at the time of processing the nut member, the tool is inserted into the through hole of the nut member from the axial direction of the through hole, and cutting is performed with use of the tool on the inner peripheral surface of the through hole of the nut member in the radial direction, to thereby form the circulation groove. Thus, it has been difficult to form the holding portion at the opening edge of the circulation groove.

Means for Solving the Problems

The present invention has been made in view of the problems as described above, and has an object to provide a ball screw device that enables achieving smooth circulation of balls in an endless circulation path even while forming a circulation groove in an inner peripheral surface of a nut member by cutting work.

That is, according to the present invention, there is provided a ball screw device, including: a large number of balls; a screw shaft having a rolling groove for the balls, which is formed in a spiral shape in an outer peripheral surface of the screw shaft; and a nut member having: a through hole that allows the screw shaft to be inserted through the through hole; and a forwarding groove, which is formed in an inner peripheral surface of the through hole, and allows the large number of balls to circulate around a periphery of the screw shaft only one round, the nut member having a load rolling groove formed therein in a spiral shape so as to face the rolling groove, and being configured to be threadedly engaged with the screw shaft through intermediation of the large number of balls that roll in the forwarding groove. The forwarding groove of the nut member includes: the load rolling groove that faces a part of the rolling groove of the screw shaft; and a circulation groove, which is formed so as to traverse a screw thread of the screw shaft to connect both ends of the load rolling groove to each other. The forwarding groove is formed so as to be adjacent to an opening edge of the through hole of the nut member. An inclination portion is provided at an angular portion at which the inner peripheral surface of the through hole and an axial end surface of the nut member intersect with each other, the inclination portion being formed by cutting out the angular portion so that the inclination portion has a non-uniform width along a circumferential direction of the through hole.

Effects of the Invention

In the ball screw device of the present invention, the inclination portion is provided at the angular portion at which the inner peripheral surface of the through hole formed in the nut member and the axial end surface of the nut member intersect with each other, and the inclination portion is formed by cutting out the angular portion so that the inclination portion has the non-uniform width along the circumferential direction of the through hole. Thus, in the ball screw device, at the time of cutting work on the nut member, an insertion angle of a cutting tool with respect to the inner peripheral surface of the through hole is not limited by a distance of the circulation groove from the axial end surface, and the cutting work can be performed for forming the circulation groove, at any appropriate insertion angle in accordance with the non-uniform width of the inclination portion. As a result, the circulation groove can be provided with sufficient holding, and hence, can guide each of the balls, which is to pass over the screw thread. Accordingly, according to the ball screw device of the present invention, it is possible to achieve smooth endless circulation of the rolling balls even while forming the circulation groove in the inner peripheral surface of the nut member by the cutting work.

BRIEF DESCRIPTION OF THE DRAWINGS

FIG. 6 is a view for illustrating a state in which the nut member in one embodiment of the present invention is observed from an axial direction thereof.

MODE FOR CARRYING OUT THE INVENTION

Now, a ball screw device of the present invention is described in detail with reference to the attached drawings.

Figure 1:
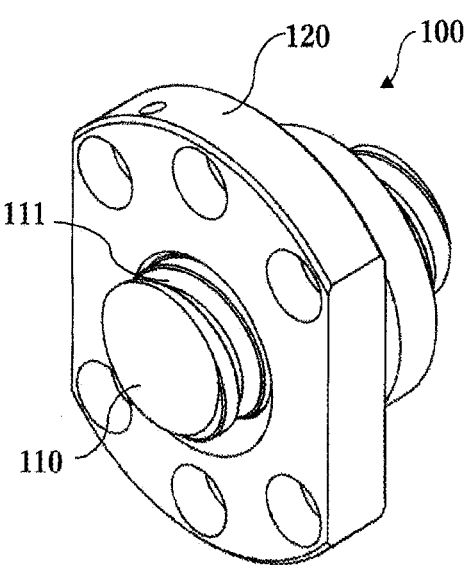
FIG. 1 is a perspective view for illustrating a ball screw device according to one embodiment of the present invention.

FIG. 1 a perspective view for illustrating a ball screw device 100 according to one embodiment of the present invention. The ball screw device 100 includes: a screw shaft 110 having a rolling groove 111 for balls, which is formed in a spiral shape in an outer peripheral surface of the screw shaft 110; and a nut member 120, which has a through hole that allows the screw shaft 110 to be inserted through the through hole, and is to be threadedly engaged with the screw shaft 110 through intermediation of a large number of the balls. With the balls rolling spirally between the screw shaft 110 and the nut member 120, when the screw shaft 110 is rotated relative to the nut member 120, the nut member 120 moves in an axial direction of the screw shaft 110, or when the nut member 120 is rotated relative to the screw shaft 110, the screw shaft 110 moves in an axial direction of the nut member 120.

Figure 2:
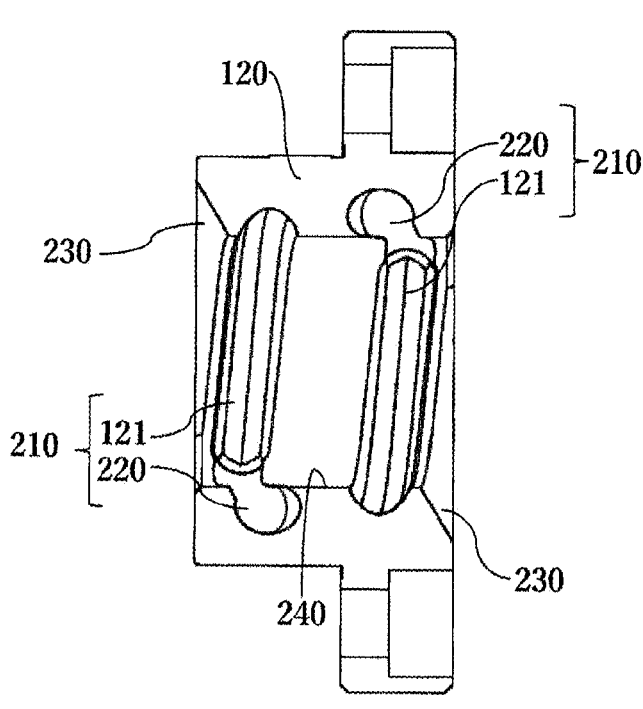
FIG. 2 is a sectional view for illustrating a nut member in one embodiment of the present invention.

FIG. 2 is a sectional view of the nut member 120 taken along the axial direction. Forwarding grooves 210 are formed in an inner peripheral surface 240 of the through hole of the nut member 120, and allows endless circulation of the balls around a periphery of the screw shaft 110. In this embodiment, a pair of the forwarding grooves 210 are formed so as to be adjacent to opening edges of the through hole of the nut member 120, respectively, and each of the forwarding grooves 210 extends one round along the inner peripheral surface 240 of the through hole of the nut member. The forwarding groove 210 includes: a load rolling groove 121 formed in the inner peripheral surface 240 of the through hole of the nut member 120; and a circulation groove 220 that connects both ends of the load rolling groove 121 to each other. In this embodiment, the forwarding grooves 210 are respectively formed at the opening edges of both ends of the through hole in an axial direction thereof, but the forwarding groove 210 may be formed at only any one of the opening edges.

The load rolling groove 121 is formed in a spiral shape so as to face a part of the rolling groove of the screw shaft 110, and to have a length smaller than that of one round around the periphery of the screw shaft. The load rolling groove 121 faces the rolling groove 111 of the screw shaft 110 to thereby form a load path, and the balls roll within the load path while bearing a load between the screw shaft and the nut member.

Meanwhile, the circulation groove 220 is formed in the inner peripheral surface 240 of the nut member 120 so as to be continuous with the load rolling groove 121, and is formed as a groove deeper than the load rolling groove 121, in order to allow each of the balls to be separated from the rolling groove 111 of the screw shaft 110 to pass over a screw thread of the screw shaft 110. That is, the circulation groove 220 is formed so as to traverse the screw thread of the screw shaft 110 to connect one end and another end of the load rolling groove 121 to each other. When the balls enter the circulation groove 220 from the load rolling groove 121, the balls are released from the load to be brought into an unloaded state. Then, when the balls enter the load rolling groove 121 from the circulation groove 220, the balls bear a load again. That is, the circulation groove 220 is a no-load path for the balls, and both ends of the load path are connected to each other via the no-load path to thereby form an endless circulation path that extends one round around the periphery of the screw shaft 110. Accordingly, the nut member 120 in this embodiment has two circuits of endless circulation paths for the balls.

Connection portions (not shown) at which passing and receiving of the balls are to be performed between the circulation groove 220 and the load rolling groove 121 are provided at both ends of the circulation groove 220, respectively. Each of the connection portions is gently inclined with respect to the circulation groove 220, which allows the balls rolling in the load rolling groove 121 to be released from a load, and also allows the balls to be gradually separated from the rolling groove of the screw shaft 110. Accordingly, each of the balls rolling in the load rolling groove 121 can smoothly enter the circulation groove 220, and thus, can pass over the screw thread of the screw shaft 110.

Figure 3:
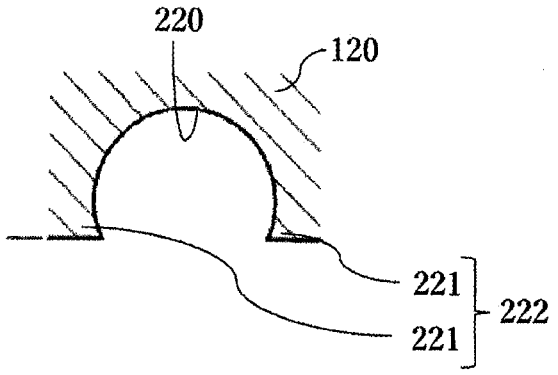
FIG. 3 is a sectional view for illustrating a circulation groove.

FIG. 3 is a sectional view of the circulation groove 220. Protruding portions 221 are respectively provided at both ends of the circulation groove 220 in a widthwise direction so as to be formed continuously along a lengthwise direction of the circulation groove 220. The protruding portions 221 each have a shape protruding toward an inside of the circulation groove 220. A holding portion 222 includes a pair of the protruding portions 221, and has an opening width that is set to be smaller than a diameter of the ball. Thus, when the ball having entered the circulation groove 220 from a terminal end of the load rolling groove 121 is to pass over the screw thread of the screw shaft 110, the ball is held by the holding portion 222, and thus, can pass over the screw thread while avoiding contact with the screw thread.

Figure 4:
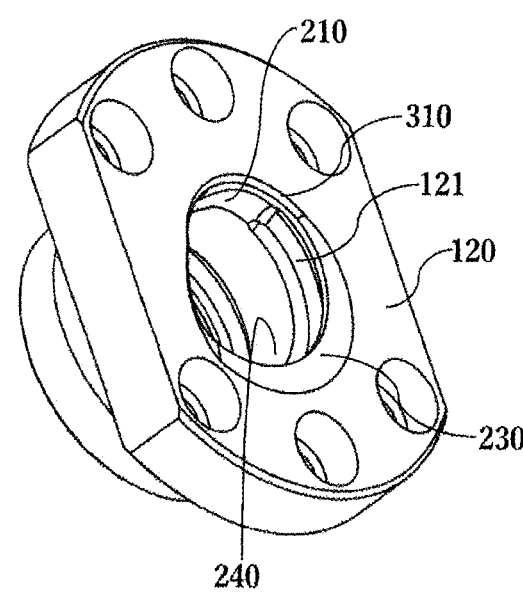
FIG. 4 is a perspective view for illustrating the nut member in one embodiment of the present invention.

As illustrated in FIG. 2 and FIG. 4, an inclination portion 230 is formed as a curved surface extending along a circumferential direction of the through hole, at an angular portion 310 at which the inner peripheral surface 240 of the through hole and an axial end surface of the nut member 120 intersect with each other. This inclination portion 230 is utilized at the time of performing cutting work on the nut member to form the circulation groove 220. The inclination portion 230 is formed by cutting out the angular portion 310 so that the inclination portion 230 has a non-uniform width. The inclination portion 230 is provided at least at a position facing by 180 degrees a formation position of the circulation groove 220 in the circumferential direction of the through hole of the nut member 120. The non-uniform width of the inclination portion 230 includes a cutout width "w" and a surface depth "h", which are described later.

Figure 5:
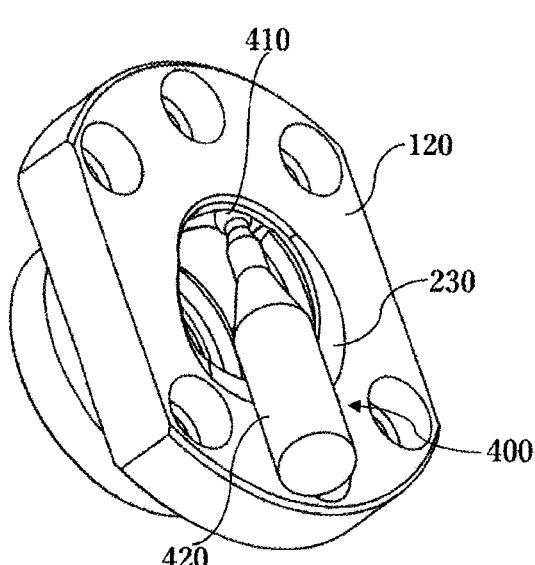
FIG. 5 is a perspective view for illustrating a state in which cutting work is being performed on the nut member.

FIG. 5 is a view for illustrating a state in which the nut member 120 is being processed with use of a ball end mill 400 serving as a cutting tool, to form the circulation groove 220. A ball end mill having a neck part formed to be thin is used as the ball end mill 400, and a spherical head 410 is formed at a distal end of a shank 420 of the ball end mill 400. At the time of performing cutting work for forming the circulation groove 220 with use of the ball end mill 400, a temporary groove is formed in advance at a position at which the circulation groove 220 is to be formed. The cutting work for the circulation groove 220 is performed by inserting the spherical head 410 of the ball end mill 400 into the temporary groove.

Figure 6:
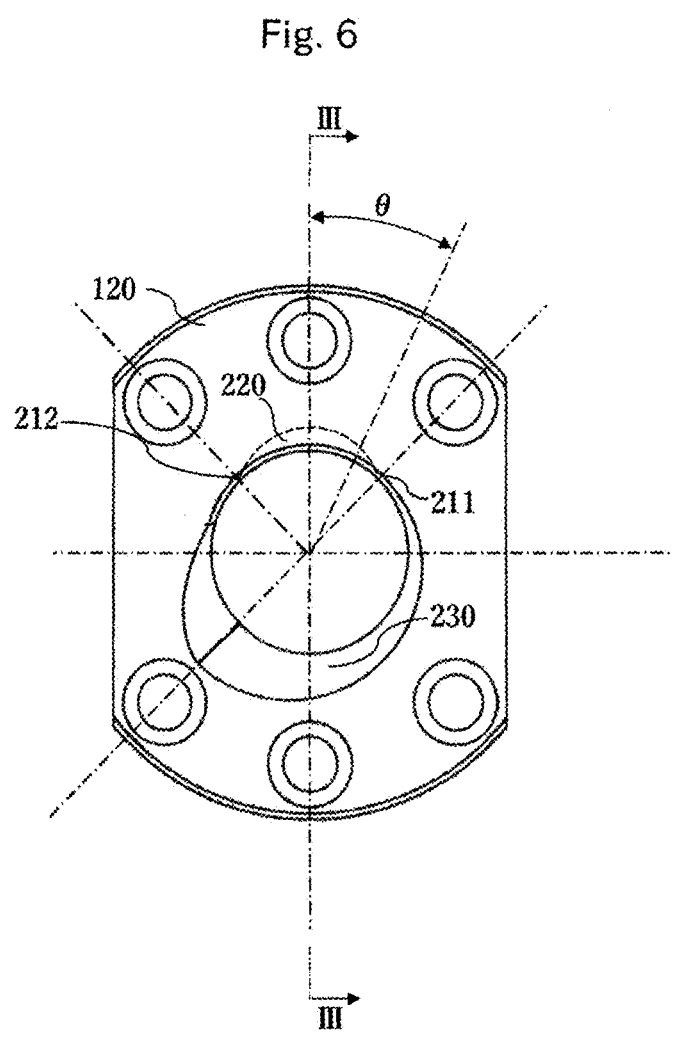

FIG. 6 shows a state in which the nut member 120 is observed from the axial direction thereof. The circulation groove 220 formed in the nut member 120 is indicated by the dashed line. An angle formed between one end part 211 and another end part 212 of the circulation groove 220 with respect to a center of the through hole is substantially 90 degrees. The circulation groove 220 connects both ends of the load rolling groove formed in a spiral shape to each other, and hence, the one end part 211 of the circulation groove is located closer to the axial end surface of the nut member 120 as compared to the another end part 212 of the circulation groove (see FIG. 4). Accordingly, in FIG. 6, the ball traveling from the one end part 211 to the another end part 212 within the circulation groove 220 is to gradually move away from the axial end surface of the nut member 120.

Figure 7:
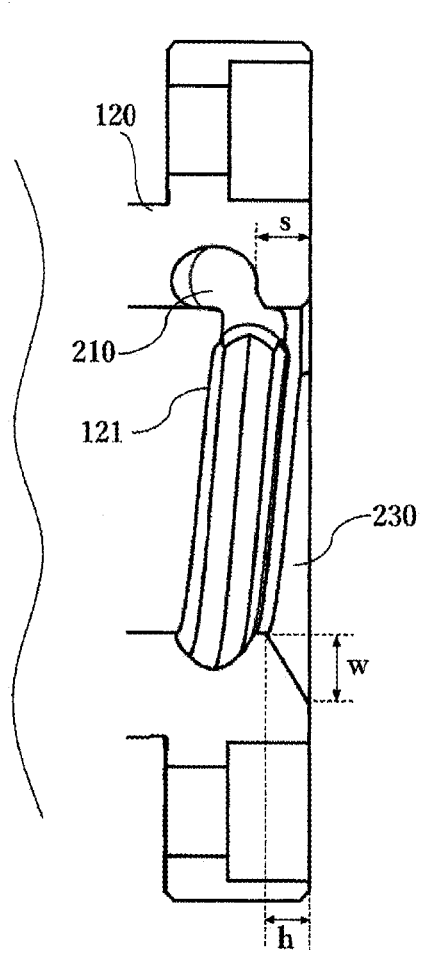
FIG. 7 is an enlarged sectional view of the nut member in one embodiment of the present invention.

FIG. 7 is an enlarged view of a part of FIG. 2. As illustrated in FIG. 6 and FIG. 7, an inclination angle of the inclination portion 230 with respect to the axial end surface of the nut member 120 is determined based on the cutout width "w" and the surface depth "h" of the inclination portion 230. Accordingly, the inclination angle of the inclination portion 230 at a portion with the larger cutout width "w" and the smaller surface depth "h" is relatively smaller. The cutout width "w" and the surface depth "h" of the inclination portion 230 are adjusted in accordance with a distance between the circulation groove 220 and the axial end surface of the nut member 120.

In the example of FIG. 6, at a position facing, substantially by 180 degrees in the circumferential direction of the through hole of the nut member, the one end part 211 of the circulation groove 220, the cutout width "w" and the surface depth "h" of the inclination portion 230 are both larger as compared to those at other positions in the inclination portion 230 (see FIG. 7). That is, the cutout width "w" and the surface depth "h" of the inclination portion 230 are maximum at a position facing, by 180 degrees in the circumferential direction of the through hole of the nut member 120, a position at which the circulation groove 220 is closest to the axial end surface of the nut member 120. In this embodiment, it is configured that the cutout width "w" and the surface depth "h" of the inclination portion 230 are maximum at the position facing by 180 degrees the position in the circulation groove 220, which is closest to the axial end surface, but the configuration is not limited thereto. It is possible to change a design appropriately as long as the cutout width "w" and the surface depth "h" vary continuously along the circumferential direction of the through hole of the nut member 120. However, as illustrated in FIG. 7, the surface depth "h" of the inclination portion 230 is set to such a depth that prevents the inclination portion 230 from interfering with the load rolling groove 121.

Figure 8:
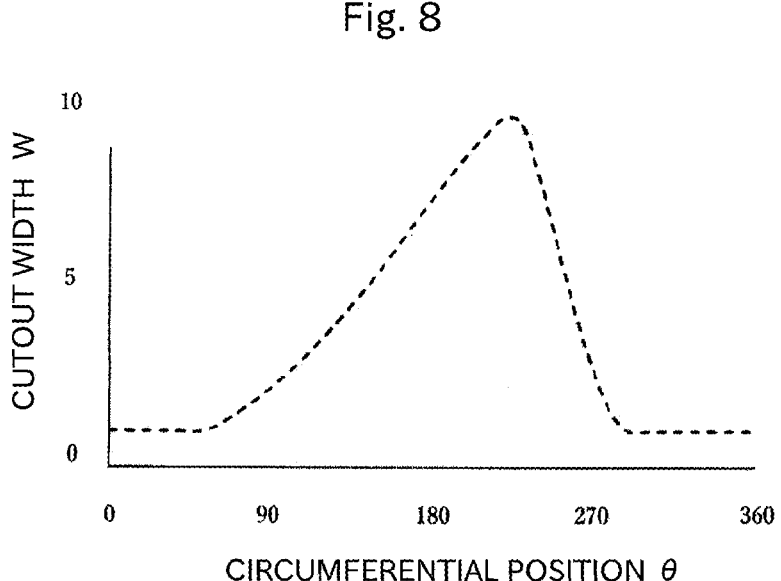
FIG. 8 is a graph for showing a relationship between a cutout width "w" of an inclination portion and a circumferential position θ.
Figure 9:
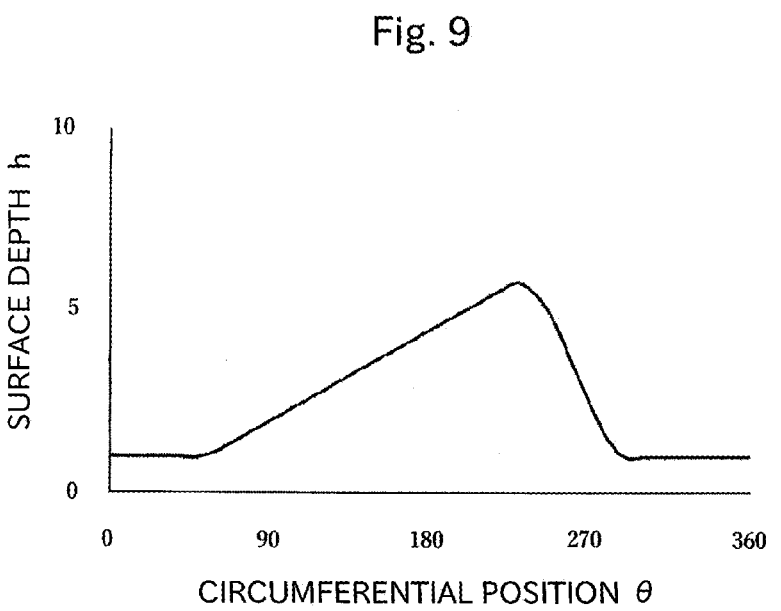
FIG. 9 is a graph for showing a relationship between a surface depth "h" of the inclination a portion and circumferential position θ.
Figure 10:
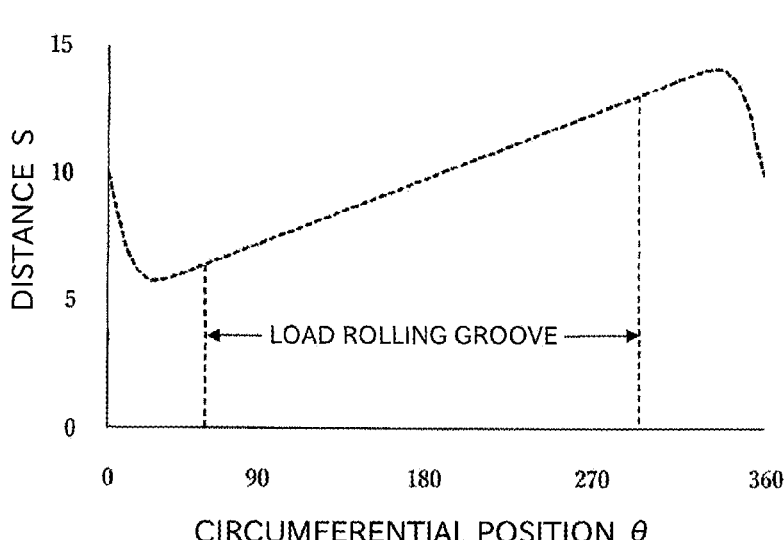
FIG. 10 is a graph for showing a relationship between a distance "s" of a circulation groove and a circumferential position θ.

FIG. 8 and FIG. 9 are graphs for showing relationships between a circumferential position θ (see FIG. 6) in the nut member 120 and the cutout width "w" and the surface depth "h" of the inclination portion 230, respectively. Further, FIG. 10 is a graph for showing relationship between a circumferential position θ in the nut member 120 and a distance "s" of the forwarding groove 210 from the axial end surface of the nut member 120. As illustrated in FIG. 7, the distance "s" refers to a formation position of the forwarding groove 210 including the circulation groove 220 with respect to the axial end surface. Further, in FIG. 10, a portion inside the dashed lines indicates the load rolling groove 121 being a part of the forwarding groove 210, and portions other than the portion inside the dashed lines indicate the circulation groove 220. As shown in those graphs, the cutout width "w" and the surface depth "h" of the inclination portion 230 are maximum at substantially the same circumferential position θ. The position at which the cutout width "w" and the surface depth "h" of the inclination portion 230 are maximum faces, substantially by 180 degrees in the circumferential direction of the nut member 120, the position at which the forwarding groove 210 is closest to the axial end surface of the nut member 120.

Further, with respect to the circumferential position θ in the nut member 120, the inclination portion 230 is provided at the position facing by 180 degrees the circulation groove 220, while being not provided at a position overlapping the circulation groove 220. Further, as the inclination portion 230 approaches a portion formed with the circulation groove 220 with respect to the circumferential position θ, the cutout width "w" and the surface depth "h" become smaller. That is, the cutout width "w" and the surface depth "h" of the inclination portion 230 vary continuously along the circumferential direction of the nut member 120.

Figure 11:
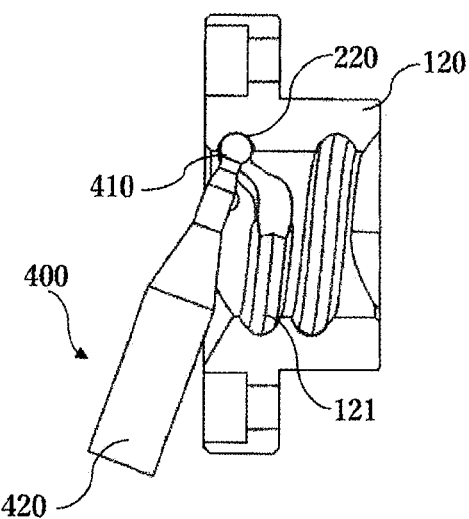
FIG. 11 is a sectional view taken along the line III-III of FIG. 6.
Figure 12:
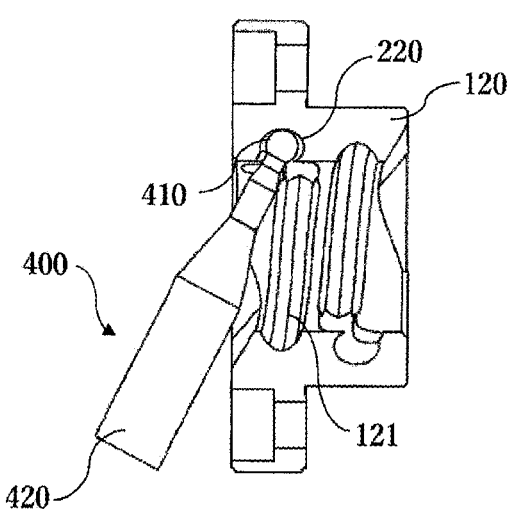
FIG. 12 is a sectional view for illustrating a state in which the cutting work is being performed on the nut member.

FIG. 11 is a sectional view taken along the line III-III of FIG. 6, and is a view for illustrating a state in which cutting work is being performed on the one end part 211 of the circulation groove 220. In this case, the cutout width "w" and the surface depth "h" of the inclination portion 230 at a position facing substantially by 180 degrees the end part 211 are set to be larger, and thus the ball end mill 400 can be stood up to a position at which the ball end mill 400 becomes substantially perpendicular to the inner peripheral surface 240 of the nut member 120. FIG. 12 is a view for illustrating a state in which the cutting work is being performed on an intermediate part of the circulation groove 220. The intermediate part of the circulation groove 220 is processed by inserting the spherical head 410 into the inner peripheral surface of the nut member 120 more deeply as compared to the case of processing the one end part 211 of the circulation groove 220.

Figure 13:
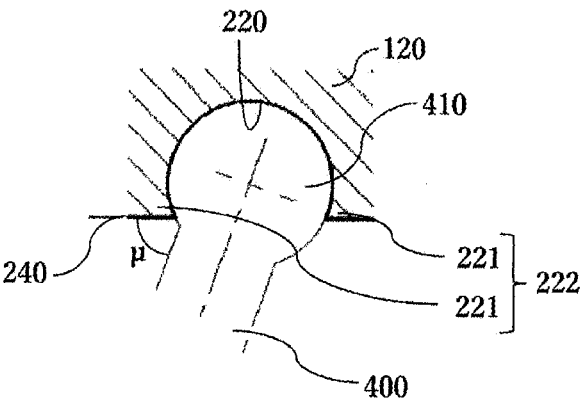
FIG. 13 is an enlarged sectional view for illustrating the circulation groove at the time when the cutting work has been performed on the nut member.

FIG. 13 is an enlarged view for illustrating the circulation groove 220 at the time when the cutting work has been performed with use of the ball end mill 400. With cutting being performed on the inner peripheral surface of the nut member 120 with use of the ball end mill 400, the circulation groove 220 having the same curvature as that of the spherical head 410 is formed in the inner peripheral surface 240 of the nut member 120. Further, as described above, the holding portion 222 including the pair of protruding portions 221 is provided to the circulation groove 220.

Figure 14:
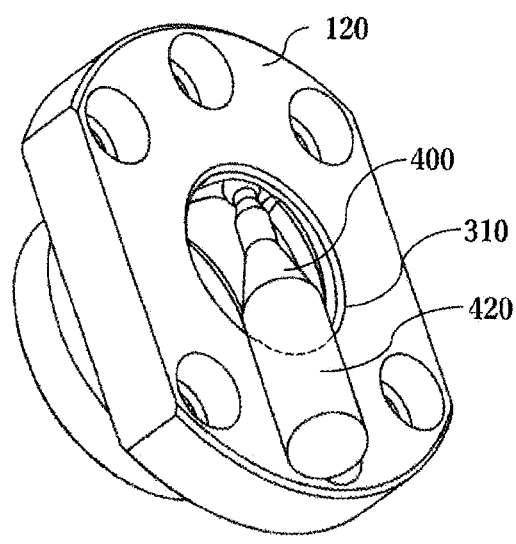
FIG. 14 is a perspective view for illustrating a state in which cutting work is performed on the related-art nut member.
Figure 15:
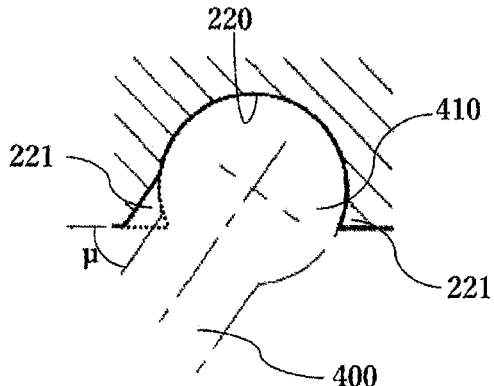
FIG. 15 is an enlarged sectional view for illustrating a circulation groove at the time when the cutting work has been performed on the related-art nut member.

In this regard, the related-art nut member has no inclination portion 230, and hence, at the time of performing cutting work on the nut member, a shank 420 of a ball end mill 400 is brought into contact with an angular portion 310 of the nut member (see FIG. 14). Accordingly, at the time of cutting work on the related-art nut member for forming a circulation groove 220, the ball end mill 400 has been unable to be inserted into the inner peripheral surface 240 while being stood up to a position at which the ball end mill 400 becomes substantially perpendicular to the inner peripheral surface 240. Then, as a result of having been unable to ensure a sufficient standing angle μ of the ball end mill 400 with respect to the inner peripheral surface 240, a holding portion 222 has been unable to be provided to the circulation groove 220.

Meanwhile, in the ball screw device 100 of the present invention, the inclination portion 230 is provided at the angular portion 310 at which the inner peripheral surface 240 of the through hole in the nut member 120 and the axial end surface of the nut member intersect with each other, and the inclination portion 230 is formed by cutting out the angular portion 310 so that the inclination portion 230 has the non-uniform width along the circumferential direction of the through hole. Accordingly, in the ball screw device 100, a standing angle μ of the ball end mill 400 with respect to the inner peripheral surface 240 can be set to be larger at the time of processing the circulation groove 220, and hence cutting work can be performed with use of the ball end mill 400 under a state in which the ball end mill 400 is substantially perpendicular to the inner peripheral surface 240. With this configuration, the holding portion 222 can be provided to the circulation groove 220, and hence the circulation groove 220 can guide each of the balls, which is to pass over the screw thread. Thus, according to the ball screw device 100 of the present invention, it is possible to achieve smooth endless circulation of the rolling balls even while forming the circulation groove in the inner peripheral surface of the nut member by cutting work.

The invention claimed is:

1. A ball screw device, comprising:

A plurality of balls;

a screw shaft having a rolling groove for the balls, which is formed in a spiral shape in an outer peripheral surface of the screw shaft; and a nut member having:

a through hole that allows the screw shaft to be inserted through the through hole; and a forwarding groove, which is formed in an inner peripheral surface of the through hole, and allows the plurality of balls to circulate around a periphery of the screw shaft only one round, the nut member being configured to be threadedly engaged with the screw shaft through intermediation of the plurality of balls that roll in the forwarding groove, wherein the forwarding groove includes:

a load rolling groove that faces a part of the rolling groove of the screw shaft; and a circulation groove, which is formed so as to traverse a screw thread of the screw shaft to connect both ends of the load rolling groove to each other, wherein the forwarding groove is formed so as to be adjacent to an opening edge of the through hole of the nut member, and wherein an inclination portion is provided at an angular portion at which the inner peripheral surface of the through hole and an axial end surface of the nut member intersect with each other, the inclination portion being formed by cutting out the angular portion so that the inclination portion has a non-uniform width along a circumferential direction of the through hole.

2. The ball screw device according to claim 1, wherein the inclination portion is provided at least at a position facing a formation position of the circulation groove in the circumferential direction of the through hole of the nut member.

3. The ball screw device according to claim 2, wherein a cutout width of the inclination portion and an inclination angle of the inclination portion with respect to the axial end surface of the nut member vary continuously along the circumferential direction of the through hole of the nut member.

4. The ball screw device according to claim 3, wherein the cutout width of the inclination portion is maximum at a position facing, in the circumferential direction of the through hole of the nut member, a position at which the circulation groove is closest to the axial end surface of the nut member.

* * * * *